(12) United States Patent
Watanabe et al.

(10) Patent No.: US 10,754,190 B2
(45) Date of Patent: Aug. 25, 2020

(54) LIGHTING DEVICE AND DISPLAY DEVICE

(71) Applicant: SHARP KABUSHIKI KAISHA, Sakai, Osaka (JP)

(72) Inventors: Hisashi Watanabe, Sakai (JP); Hirotoshi Yasunaga, Sakai (JP); Youzou Kyoukane, Sakai (JP); Takeshi Masuda, Sakai (JP)

(73) Assignee: SHARP KABUSHIKI KAISHA, Sakai, Osaka (JP)

( * ) Notice: Subject to any disclaimer, the term of this patent is extended or adjusted under 35 U.S.C. 154(b) by 0 days.

(21) Appl. No.: 16/566,167

(22) Filed: Sep. 10, 2019

(65) Prior Publication Data

US 2020/0089056 A1 Mar. 19, 2020

Related U.S. Application Data (60) Provisional application No. 62/732,184, filed on Sep. 17, 2018.

(51) Int. Cl.
*G02F 1/1335* (2006.01)
*G02F 1/1343* (2006.01)
(Continued)

(52) U.S. Cl.
CPC .. *G02F 1/133605* (2013.01); *G02F 1/136286* (2013.01); *G02F 1/133603* (2013.01); *G02F 1/134309* (2013.01)

(58) Field of Classification Search
CPC ....... H01L 33/60; H01L 33/42; H01L 33/486; H01L 33/405; H01L 2924/12041; H01L 51/5271; H01L 51/5253; H01L 2224/73265; F21Y 2115/10; F21Y 2105/00; F21Y 2105/12; F21Y 2107/50; F21Y 2101/00; H05K 2201/10106; H05K 2201/2054; H05K 1/05; H05K 1/112; H05K 1/117; G02F 1/1333; G02F 1/133308; G02F 1/133504; G02F 1/133553; G02F 1/133602; G02F 1/133603; G02F 1/133608; G02F 1/136227; G02F 1/136286;
(Continued)

(56) References Cited

U.S. PATENT DOCUMENTS

2011/0241043 A1* 10/2011 Nakayama .............. H01L 33/60
257/98

FOREIGN PATENT DOCUMENTS

JP 2012-003000 A 1/2012

* cited by examiner

*Primary Examiner* — Thoi V Duong
(74) *Attorney, Agent, or Firm* — ScienBiziP, P.C.

(57) ABSTRACT

A lighting device includes a substrate and light sources that are top-emitting light sources. The substrate includes a first plate surface and a second plate surface. The light sources include first electrodes and second electrodes. A reflection layer made of metal, an insulating layer, and a first conductive pattern are formed on the first plate surface in this sequence from a lower layer side. A second conductive pattern is formed on the second plate surface. The light sources are disposed on the first plate surface with the first electrodes and the second electrodes electrically connected to the first conductive pattern and at least the first electrodes or the second electrodes electrically connected to the second conductive pattern via holes in the substrate. The reflection layer is divided into divided reflection areas by slits. The holes are formed in the divided reflection areas, respectively.

9 Claims, 10 Drawing Sheets

(51) Int. Cl.
*G02F 1/1333* (2006.01)
*G02F 1/13357* (2006.01)
*G02F 1/1362* (2006.01)

(58) Field of Classification Search
CPC ............. G02F 1/133605; G02F 1/1345; G02F 1/133345; G02F 1/1335; G02F 1/1336; G02F 1/1343; G02F 1/134309; G02F 2001/133612; G02F 2203/02; H05B 45/00; H05B 45/40
See application file for complete search history.

LIGHTING DEVICE AND DISPLAY DEVICE

CROSS REFERENCE TO RELATED APPLICATION

This application claims priority from U.S. Provisional Patent Application No. 62/732,184 filed on Sep. 17, 2018. The entire contents of the priority application are incorporated herein by reference.

TECHNICAL FIELD

The technology described herein relates to a lighting device and a display device.

BACKGROUND ART

Display devices that include display panels such as liquid crystal panels are used in portable information terminals, electronic devices, and television devices include display devices that include display panels. Examples of the portable information terminals include mobile phones, smartphones, and tablet-type notebook personal computers. Examples of the electronic devices include computers. In such display devices, the liquid crystal panels do not emit light and thus lighting devices, that is, backlight units are required. The backlight units are generally categorized into a direct type and an edge-light type according to structures. Each of the direct type backlight units includes top-emitting LEDs mounted on a substrate on which a conductive pattern is formed. Light emitted by the LEDs uniformed through an optical member such as a diffuser plate is supplied to a liquid crystal panel.

The substrate used in such a backlight unit includes mounting areas in which the LEDs are mounted. White resists are formed in areas of the substrate other than the mounting areas to improve insulating properties and reflectivity. Alternatively, a reflection sheet including holes in areas corresponding to the LED mounting areas and having high reflectivity is disposed.

Reflectivity of white resists is usually 90% or lower. Therefore, light is not effectively used and a sufficient level of brightness cannot be achieved for the backlight. To place the reflection sheet having the reflectivity higher than that of the white resists, it may be difficult to align the holes in the reflection sheet with the LEDs and fix the reflection sheet. Furthermore, the reflection sheet may be placed over the LEDs if thermal expansion and contraction of the reflection sheet occur. To resolve such problems, certain sizes of holes may be required. Because the reflectivity of a surface of the substrate exposed through the holes is low, the light cannot be effectively used. If the number of the LEDs is large (namely, the number of the holes is large), such a problem becomes larger. To reduce displacement of the reflection sheet due to the thermal expansion and contraction, the reflection sheet may be bonded to the substrate with an adhesive layer. However, the substrate on which the LEDs are mounted is not flat and thus a roller cannot be used. Therefore, it is difficult to bond the reflection sheet to the substrate with high accuracy without air bubbles. If a metal thin film is used for the reflection sheet, opening edges of holes in the metal thin film may contact solders that were provided for electrical connection for the LEDs and leak currents may occur. To reduce the leak current, the holes in areas in which the LEDs are mounted may be increased in size. However, the surface of the substrate having lower reflectivity may be exposed through the holes resulting in reduction of brightness.

SUMMARY

The technology described herein was made in view of the above circumstances. An object is to provide a lighting device and a display device that include surfaces having proper reflectivity for entire areas.

A lighting device includes a substrate and light sources. The substrate includes a first plate surface and a second plate surface. The light sources include first electrodes and second electrodes. The light sources are top-emitting light sources. A reflection layer made of metal, an insulating layer, and a first conductive pattern are formed on the first plate surface in this sequence from a lower layer side. A second conductive pattern is formed on the second plate surface. The light sources are disposed on the first plate surface with the first electrodes and the second electrodes electrically connected to the first conductive pattern and at least the first electrodes or the second electrodes electrically connected to the second conductive pattern via holes in the substrate. The reflection layer is divided into divided reflection areas by slits. The holes are formed in the divided reflection areas, respectively.

A display device includes the lighting device described above and a display panel.

According to the technology described herein, a lighting device and a display device including surfaces having proper reflectivity for entire areas are provided.

DETAILED DESCRIPTION

An embodiment will be described with reference to FIGS. 1 to 5. In this embodiment section, a liquid crystal display device 10 (an example of a display device) including a liquid crystal panel 11 will be described. An upper side and a lower side in FIG. 1 correspond to a front side and a rear side of the liquid crystal display device 10. For multiple components having the same configuration, only one of those components may be indicated by a reference symbol and others may not be indicated by the reference symbol.

(Liquid Crystal Display Device 10)

The liquid crystal display device 10 has a rectangular shallow box shape as a whole. The liquid crystal display device 10 includes the liquid crystal panel 11 (an example of a display panel) and a backlight unit 20 (an example of a lighting device). The liquid crystal panel 11 is configured to display images. The backlight unit 20 is disposed behind the liquid crystal panel 11 and configured to supply light to the liquid crystal panel 11 for image display. The liquid crystal panel 11 and the backlight unit 20 are held together by a bezel 15 having a frame shape. The liquid crystal display device 10 according to this embodiment may be used for a television device.

Liquid Crystal Panel 11

The liquid crystal panel 11 has a known configuration. The configuration includes two substrates each having rectangular shapes bonded together with a predefined gap therebetween and a liquid crystal layer between the substrates. The substrates include glass substrates, respectively. Each of the glass substrates may be non-alkaline glass having high light transmissivity. Multiple films are stacked on each of the glass substrates through known photolithography.

One of the substrates on the rear side (the lower side in FIG. 1) is an array substrate that includes switching components (i.e., TFTs) connected to source lines and gate lines that are perpendicular to each other, pixel electrodes that are connected to the switching components, and an alignment film. The other one of the substrates on the front side (the upper side in FIG. 1) is a CF substrate that includes color filters, a common electrode, and an alignment film. The color filters include red (R), green (G), and blue (B) color portions arranged in a predefined pattern. Image data and various control signals required for displaying images are supplied to the source lines, the gate lines, and the common electrode by a control circuit board. Polarizing plates are disposed on outer surfaces of the substrates. The liquid crystal panel 11 displays imaged using the light supplied by the backlight unit 20. The front side of the liquid crystal panel 11 is a light exiting side.

Bezel 15

Figure 1:
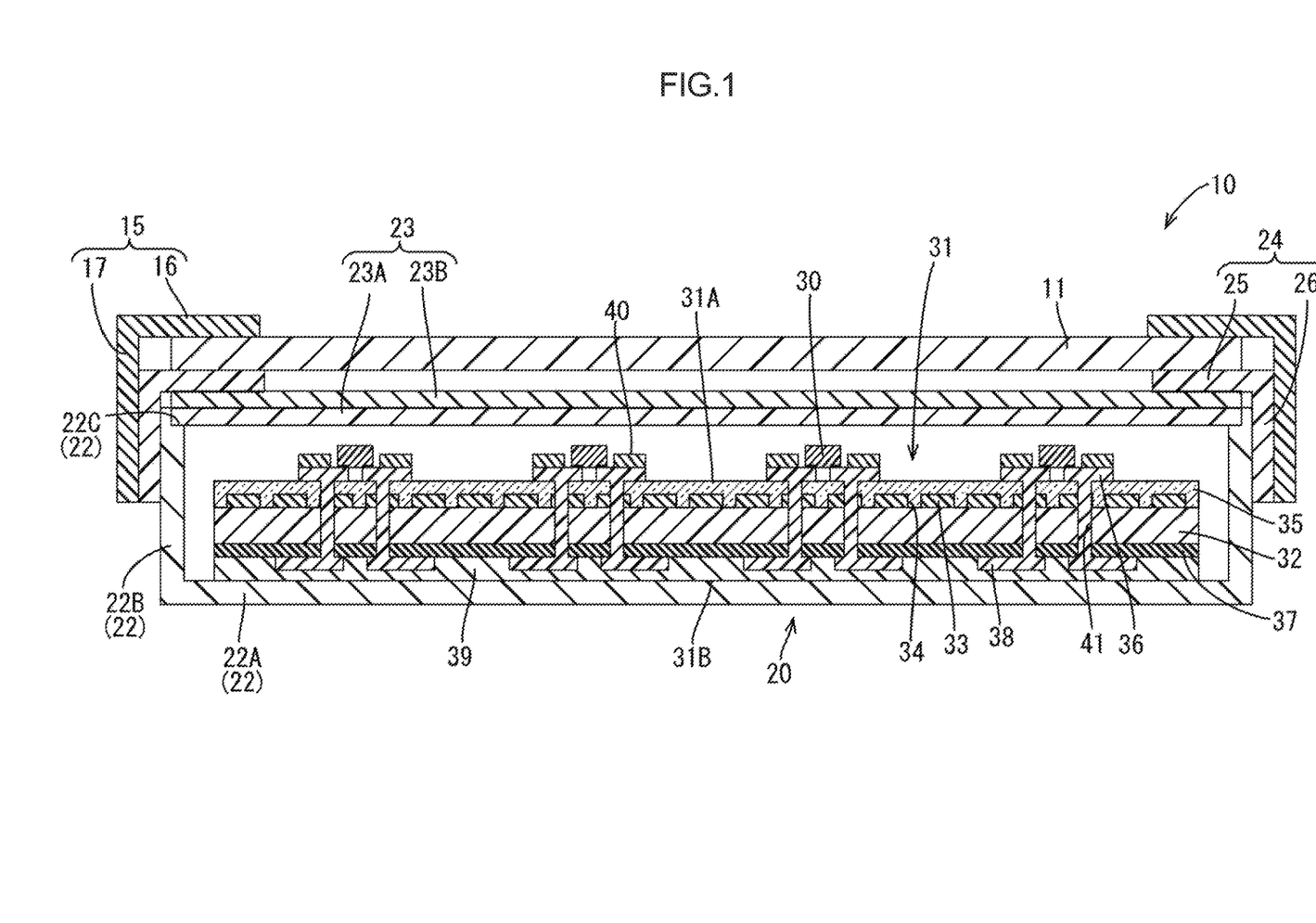
FIG. 1 is a side cross-sectional view of a liquid crystal display device according to an embodiment.

The bezel 15 is made of metal such as aluminum. The bezel 15 has a rectangular frame shape as a whole. As illustrated in FIG. 1, the bezel 15 includes a panel holding portion 16 and a periphery portion 17. The panel holding portion 16 holds an outer edge portion of the liquid crystal panel 11 for an entire perimeter from the front side. The periphery portion 17 protrudes from a peripheral edge portion of the panel holding portion 16 to the rear side to surround the outer periphery of the backlight unit 20 (a periphery portion 26 of a frame 24, which will be described later). The liquid crystal panel 11 is the bezel 15 sandwiched between the bezel 15 and the backlight unit 20 and held.

Backlight Unit 20

As illustrated in FIG. 1, the backlight unit 20 includes a chassis 22, an optical member 23, and the frame 24. The chassis 22 has a box shape with an opening on the liquid crystal panel 11 side. The optical member 23 is disposed to cover the opening of the chassis 22. The frame 24 is disposed along outer edges of the chassis 22 so that an outer edge portion of the optical member 23 is sandwiched between the chassis 22 and the frame 24.

In the chassis 22, LEDs 30 are disposed at positions directly behind the optical member 23 (the liquid crystal panel 11) to be opposed to the optical member 23 and an LED substrate 31 on which the LEDs 30 are mounted are disposed. The backlight unit 20 in this embodiment is a direct backlight. The LED substrate 31 is held at a predefined position by a holding mechanism. Next, the components of the backlight unit 20 will be described.

Chassis 22

The chassis 22 is prepared from an aluminum sheet or an electrolytic zinc-coated steel sheet (SECC). The chassis 22 has a shallow box shape (a shallow tray shape) as a whole with an opening on the front side. The chassis 22 includes a bottom plate 22A and side plates 22B. The bottom plate 22A has a horizontally-long rectangular shape similar to the shape of the liquid crystal panel 11. The side plates 22B project from outer edges of the bottom plate 22A toward the front side (the light exiting side, the side on which the LEDs 30 are disposed), respectively. Inner portion of distal ends of the side plates 22B are cut out so that the distal ends form L shapes and receiving portions 22C on which ends of the optical member 23 are placed. The optical member 23 placed on the receiving portions 22C of the chassis 22 are held by the frame 24 from the front side.

Optical Member 23

The optical member 23 is for converting light emitted by the LEDs 30 into uniform planar light. The optical member 23 has a horizontally-long rectangular shape similar to the shapes of the liquid crystal panel 11 and the chassis 22 in a plan view. As illustrated in FIG. 1, the outer edges of the optical member 23 are placed on the receiving portions 22C so that the optical member 23 covers the opening of the chassis 22. The optical member 23 is disposed between the liquid crystal panel 11 and the LEDs 30 (the LED substrate 31).

More specifically, the optical member 23 is disposed opposite on the front side relative to the LEDs 30, that is, on the light exiting side with a predetermined distance away from the LEDs 30. The optical member 23 in this embodiment includes a diffuser plate 23A on the rear side (the LED 30 side) and an optical sheet 23B on the front side (the liquid crystal panel 11 side, the light exiting side). The diffuser plate 23A includes a base made of substantially transparent resin and formed in a plate shape with a predefined thickness and diffuser particles disposed in the base. The diffuser plate 23A has a function of diffusing light that passes through the diffuser plate 23A. The optical sheet 23B includes sheets having a thickness smaller than the thickness of the diffuser plate 23A. The sheets included in the optical member 23 may be selected from a fluorescence emission sheet, a diffuser sheet, a prism sheet, and a polarized reflection sheet where appropriate.

Frame 24

The frame 24 is made of resin such as white polycarbonate having higher reflectivity. The frame 24 includes a sheet holding portion 25 and the periphery portion 26. The sheet holding portion 25 has a frame shape along the outer edge portion of the optical member 23 to sandwich the edges of the optical member 23 with the receiving portions 22C of the chassis 22. The periphery portion 26 projects from an outer edge portion of the sheet holding portion 25 toward the rear side to surround the side plates 22B of the chassis from the outer periphery. The sheet holding portion 25 receives the edges of the liquid crystal panel 11 from the rear side. The edges of the liquid crystal panel 11 are sandwiched between the panel holding portion 16 of the bezel 15 on the front side and the sheet holding portion 25 (see FIG. 1).

LEDs 30

The LEDs 30 are mounted on the LED substrate 31. A light emitting surface of each LED 30 is facing an opposite side from the LED substrate 31. Namely, the LEDs 30 are top-emitting LEDs. The light emitting surfaces of the LEDs 30 are opposed to the plate surface of the optical member 23. Each LED 30 includes an LED chip (an LED component), which is a semiconductor light emitting component, sealed by a resin material on a substrate that is disposed on the plate surface of the LED substrate 31. The LED chip mounted on the substrate is configured to have one kind of main light emission wavelength, specifically, to emit light in a single color of blue. The resin material that seals the LED chip contains phosphors that emit a predefined color of light when excited by the blue light emitted by the LED chip. The phosphors are dispersed in the resin material. Therefore, substantially white light is emitted. An LED that includes a sealing resin material that does not contain phosphors may be used. Alternatively, an LED chip may be mounted without sealed by the resin material. Because the LED emits blue light, the fluorescent emission sheet may be required for the optical sheet 23B so that white light is emitted.

The LEDs 30 in this embodiment use the flip-chip packaging technology. First electrodes 30A and second electrodes 30B are disposed on surfaces opposed to the LED substrate 31.

LED Substrate 31

Figure 4:
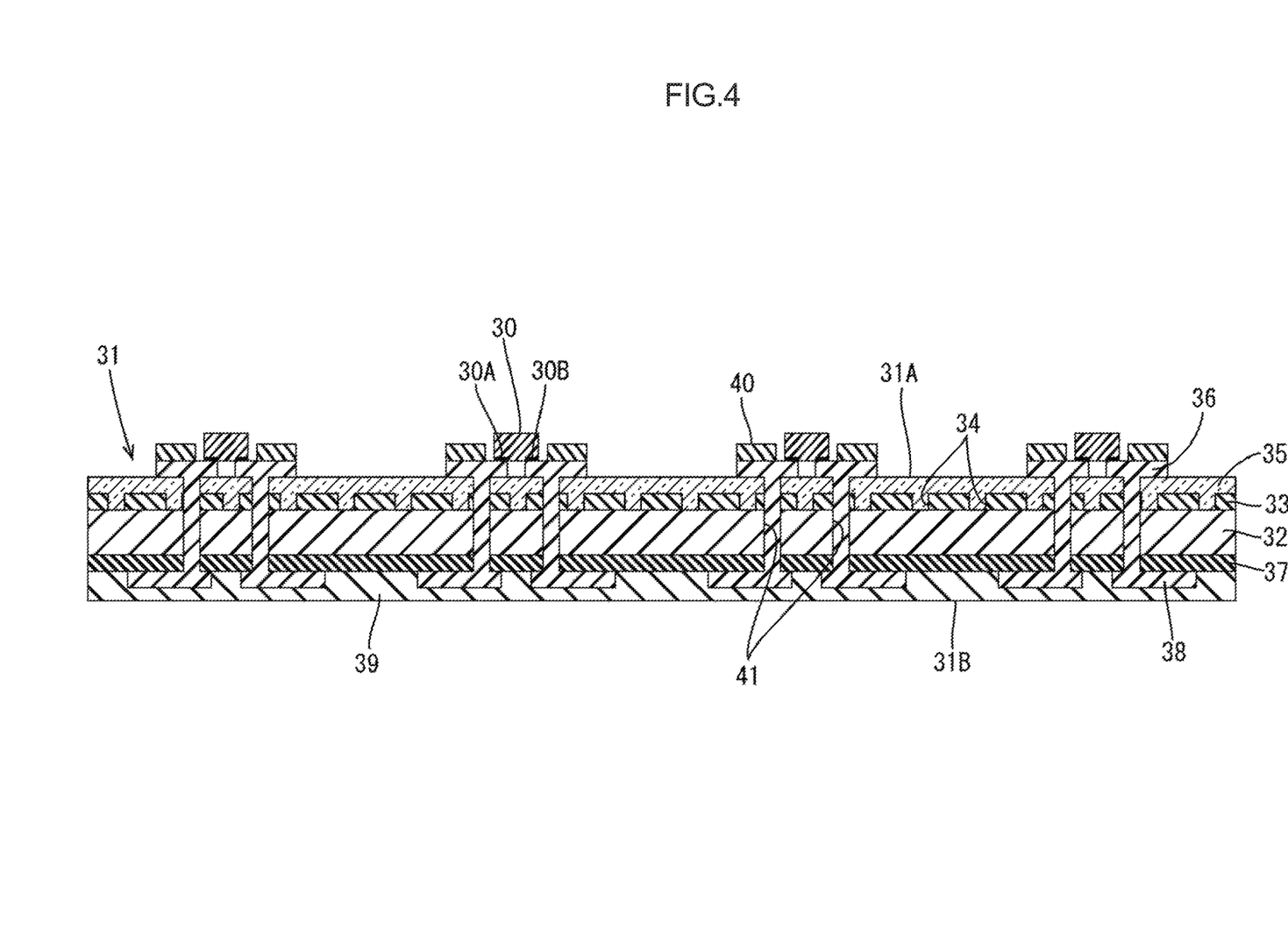
FIG. 4 is a side cross-sectional view of the LED substrate.

As illustrated in FIGS. 1 and 4, the LED substrate 31 (an example of a substrate) has a horizontally-long rectangular shape similar to the shape of the bottom plate 22A of the chassis 22. The LED substrate 31 is disposed to extend along the bottom plate 22A and held in the chassis 22. The LED substrate 31 includes a base 32 made of an insulating material such as glass epoxy and polyimide. The LED substrate 31 includes a reflecting layer 33 on an entire area of a first plate surface 31A opposed to the optical member 23. On the reflecting layer 33 on the first plate surface 31A, a first insulating layer 35 is formed in an entire area. The first insulating layer 35 is made of a transparent inorganic material such as silicon dioxide (SiO2) or a transparent resin material such as acrylic and epoxy. A first conductive pattern 36 is formed on the first insulating layer 35. The first conductive pattern is prepared from a metal film such as a copper foil. A second conductive pattern 38 is formed on a second insulating layer 37 on a second plate surface 31B opposed to the bottom plate 22A and covered with an overcoat layer 39. The second conductive pattern 28 is prepared from a metal film such as a copper foil.

The first conductive pattern 36 on the first plate surface 31A is electrically connected to the second conductive pattern 38 via holes 41 that are drilled through the LED substrate 31 in a thickness direction. The LEDs 30 having the configuration described earlier are mounted on the first conductive pattern 36 using the flip-chip packaging technology. The holes 41 in this embodiment are formed such that every two of the holes 41 are located adjacent to a mounting area of corresponding one of the LEDs 30. More specifically, the first electrode 30A and the second electrode 30B of the LED 30 are electrically connected to the first conductive pattern 36 with solders and then to the second conductive pattern 38 via the first conductive pattern and the adjacent holes 41. The first conductive pattern 36 in this embodiment includes electrode pads, on which the LEDs 30 are mounted, and lines that are routed from the electrode pads to the holes 41. Circuit wiring is formed by the second conductive pattern 38 on the back surface (the second plate surface 31B) of the LED substrate 31. Driving powers are supplied from an LED driver circuit board (a light source driver circuit board) connected to the second conductive pattern 38 to the LEDs 30. The circuit wiring are formed on the back surface of the LED substrate 31 to reduce a percentage of the conductive pattern that has lower light reflectivity by reducing the lines on the front surface of the LED substrate 31 to increase an area of the reflection layer 33 that has higher light reflectivity as much as possible. According to the configuration, the light can be effectively used and thus the brightness significantly improves.

Figure 5:
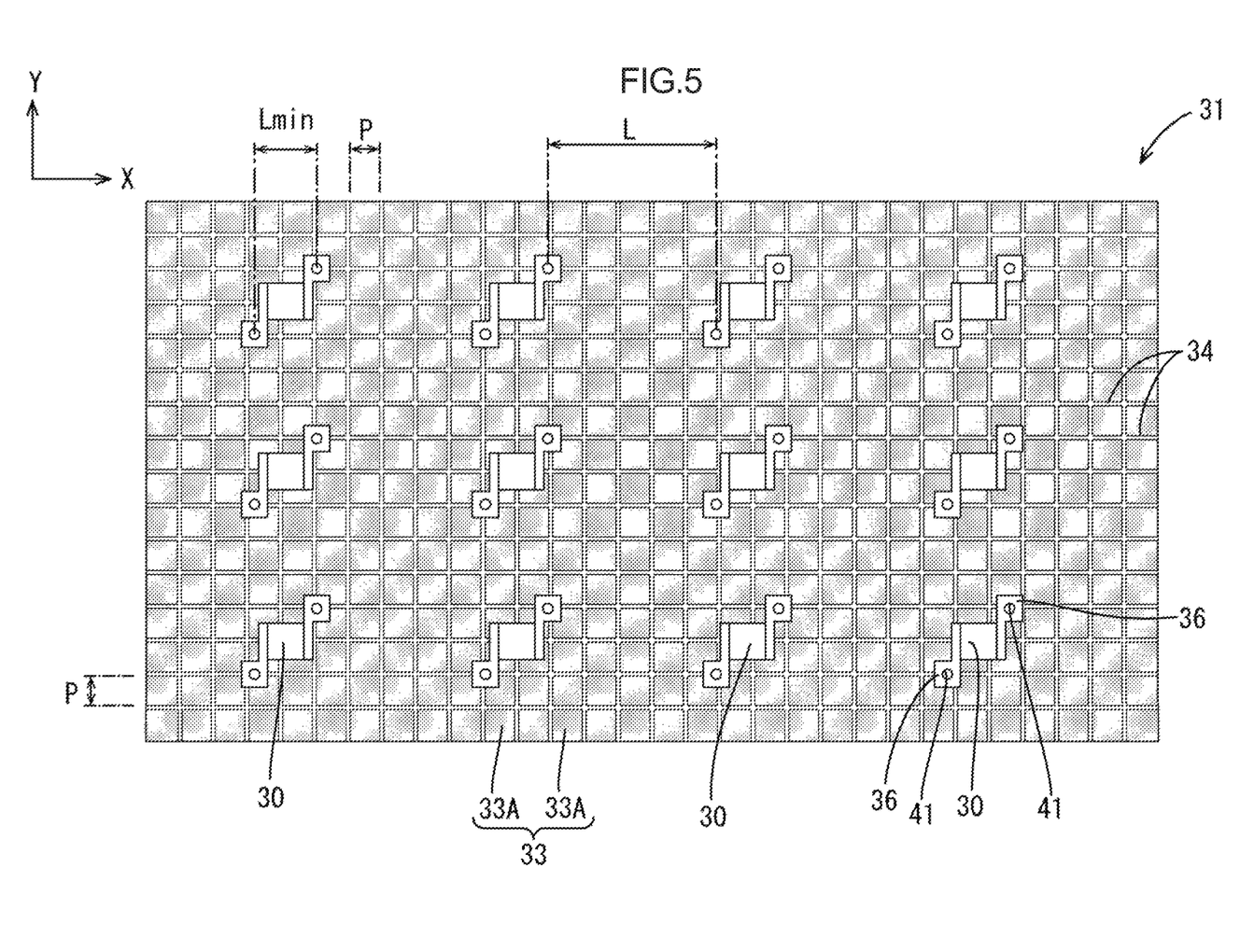
FIG. 5 is a plan view of the LED substrate.

As illustrated in FIG. 5, the LEDs 30 are arranged with substantially constant pitch (at equal intervals) along the long edge and the short edge of the LED substrate 31. In FIG. 5, four along the long edge by three along the short edge, that is, twelve LEDs 30 are arranged in a matrix. This embodiment is an example and the number of the LEDs may be altered according to specifications including screen sizes and required brightness.

Rays of light emitted by the LEDs 30 and returned to the LED substrate 31 are reflected by the reflection layer 33 toward the front side and included in the emitting light.

Reflection Layer 33

Next, the reflection layer 33 will be described in detail. The reflection layer 33 is prepared from a metal thin film having higher light reflectivity. The metal thin film may be made of silver, aluminum, or an alloy containing silver or aluminum. The reflection layer 33 is formed on the front surface of the base 32 of the LED substrate 31 closer to the first plate surface 31A through spattering or vapor deposition to cover the front surface. The reflection layer 33 extends parallel to the bottom plate 22A of the chassis 22 and the plate surface of the optical member 23. Distances between the optical member 23 and the reflection layer 33 in the normal direction are substantially constant within an entire area of the reflection layer 33. With the reflection layer 33, the rays of light returned to the LED substrate 31 are reflected toward the front side (the light exiting side, the optical member 23 side). The thickness of the reflection layer 33 is preferably within a range from 0.05 µm to 1 µm. If the thickness is less than 0.05 µm, sufficient reflectivity cannot be achieved. If the thickness is greater than 1 µm, warp of the base 32 may occur or it may be difficult to form fine slits 34, which will be described later. For the reasons, the range is proper.

As illustrated in FIG. 5, the slits 34 are formed in the reflection layer 33. The slits 34 are arranged at equal intervals in rows and columns along the long edge and the short edge of the LED substrate 31 and continuously from a first end to a second end of the reflection layer 33 (the LED substrate 31). The reflection layer 33 is divided into square areas by the slits 34. The square areas are arranged in a grid. Each of the areas of the reflection layer 33 divided by the slits 34 (each area defined by the slits 34) will be referred to as a divided reflection area 33A. The adjacent divided reflection areas 33A are insulated from each other by the slits 34.

Widths of the slits 34 are preferably in a range from 3 µm to 30 µm. If the widths are less than 3 µm, electrically conductive portions may be formed depending on accuracy in slit formation and electrical insulation may be instable. If the widths are greater than 30 µm, an exposed area of the surface of the base 32 having the lower reflectivity increases and thus the reflectivity decreases.

A pitch P of the slits 34 arranged at equal intervals is defined smaller than the shortest distance Lmin between two holes 41 in a direction perpendicular to an extending direction of the slits 34 (P<Lmin). In FIG. 5, the pitch P of the slits 34 that extend in the Y direction with the equal intervals is smaller than the shortest distance Lmin among distances L between the holes 41 in the horizontal direction or the X direction (P<Lmin). Namely, the reflection layer 33 is divided into the divided reflection areas 33A such that at least one slit 34 is provided between every adjacent holes 41 in the direction perpendicular to the extending direction of the slits 34 arranged at equal intervals.

Namely, the holes 41 are provided in the divided reflection areas 33A, respectively. According to the configuration, portions between the adjacent holes 41 are electrically insulated from each other. With the reflection layer 33, the electrodes 30A and 308 of each LED 30 or the electrodes 30A and 308 of different LEDs 30 are not electrically connected. Each hole 41 may be within one divided reflection area 33A or extends from one divided reflection area 33A to the adjacent divided reflection area 33A as long as two or more holes 41 are not provided in one divided reflection area 33A. If any two of the holes 41 are not used for electrical insulation, the slit 34 may not be required between the holes 41. Through holes formed adjacent to each other to reduce electrical resistances may be an example of the above case.

The pitch P of the slits 34 is preferably in a range from 0.1 mm to 5 mm. If the pitch P of the slits 34 is greater than 5 mm, the shortest distance Lmin between the holes 41 needs to be set to a longer distance resulting in an increase in area of the surface of the LED substrate 31 in which the electrodes are routed. Therefore, the light use efficiency of the backlight unit 20 decreases. If the pitch P is less than 0.1 mm, the number of slits increases and thus the exposed area of the surface of the base 32 having the lower reflectivity increases and thus the reflectivity of the LED substrate 31 decreases. Namely, the light use efficiency of the backlight unit 20 decreases.

Figure 2:
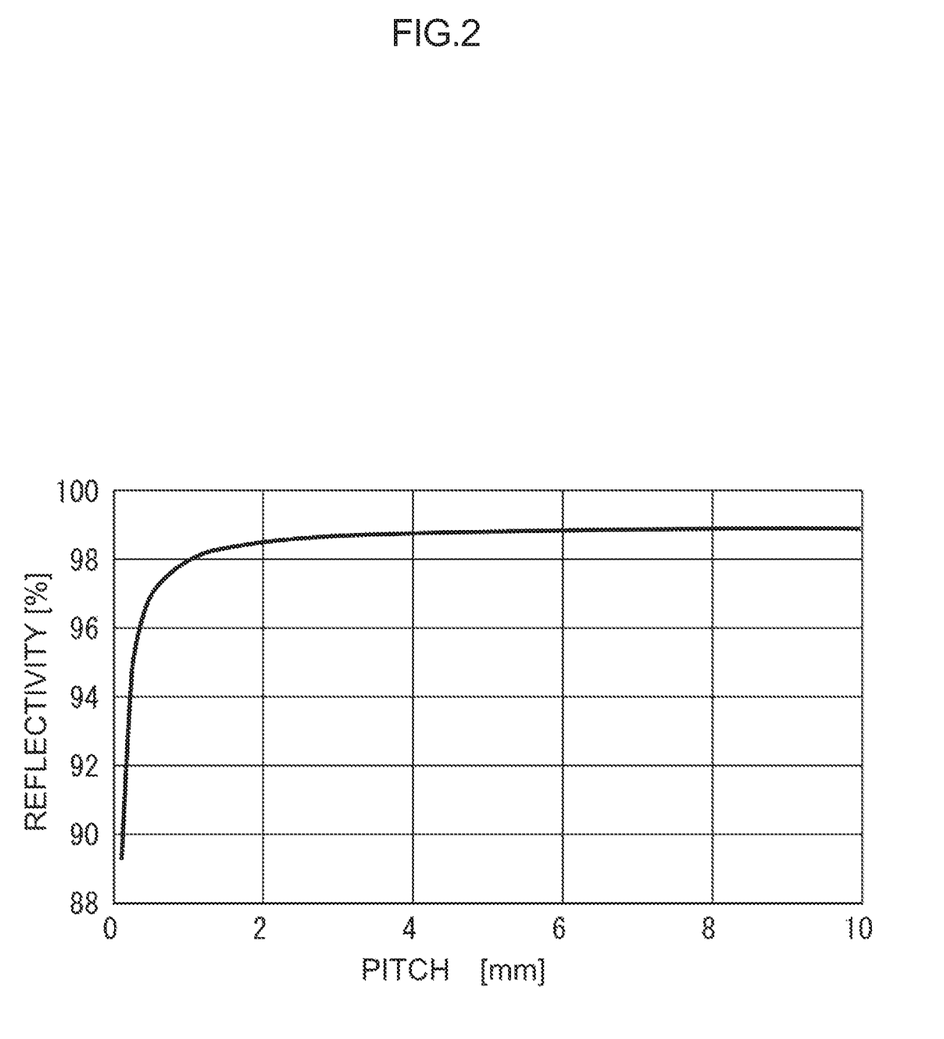
FIG. 2 is a graph illustrating a relation between a pitch of slits and reflectivity.

FIG. 2 is a graph illustrating a relation between the pitch of the slits 34 and the reflectivity when the width of the slits 34 is set to 5 μm. When the pitch of the slits 34 is 0.1 mm, the reflectivity is about 90%. When the pitch is 0.1 mm or greater, reflection effect greater than that of the white paint (with the reflectivity of 90% or less) can be achieved. When the pitch is 0.5 mm or greater, the reflectivity is 97% or higher, that is, higher reflectivity can be achieved. When the pitch is 1.5 mm or greater, the reflectivity is 98.5% or higher, that is, a decrease in reflectivity due to the slits 34 is less likely to be observed. Therefore, it is preferable that the pitch is in a range from 0.1 to 5 mm. A protective layer for protecting the metal from deterioration or a reflection enhancing layer for increasing the reflectivity may be stacked on the reflection layer 33.

White paint layers 40 such as white resists that exhibit white are formed on the exposed areas of the surface of the first conductive pattern 36 (areas other than the areas in which the LEDs 30 are mounted). According to the configuration, the reflectivity further increases.

Figure 3A:
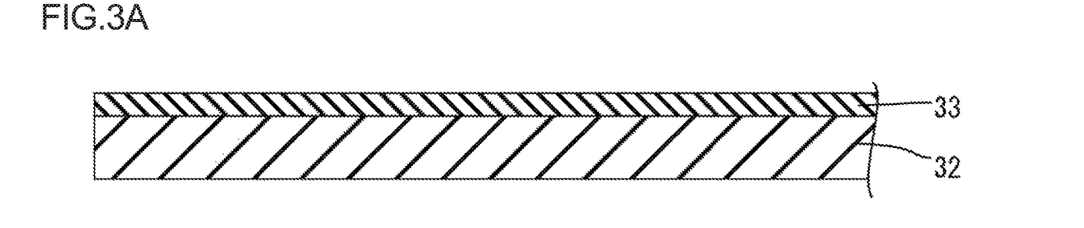
FIG. 3A is a schematic view illustrating a step in a production process of an LED substrate (reflection layer formation).

The configuration is as described above. Next, a method of producing the LED substrate 31 will be described. As illustrated in FIG. 3A, the reflection layer 33 made of metal having the higher reflectivity is formed on the surface of the base 32 made of glass epoxy or polyimide having an insulating property. The metal having the higher reflectivity may be silver, aluminum, or an alloy containing silver or aluminum. The reflection layer 33 is formed through bonding of a metal thin film, vapor deposition, or spattering.

Figure 3B:
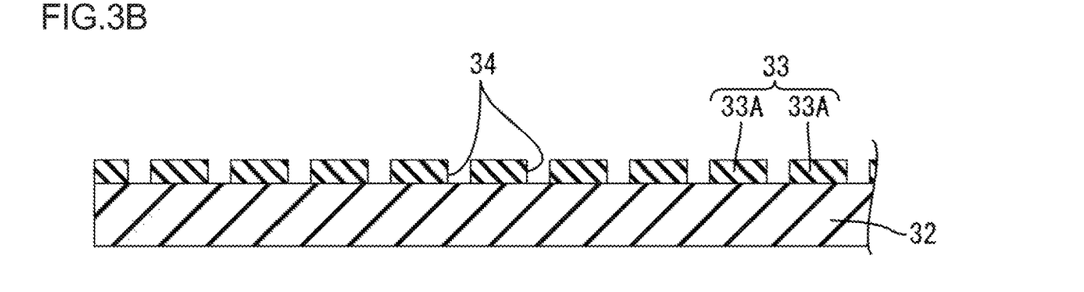
FIG. 3B is a schematic view illustrating a step in the production process of the LED substrate (slit formation).

Next, as illustrated in FIG. 3B, the slits 34 are formed in the reflection layer 33. The slits 34 may be formed through known photolithography (resist application->exposure->development->etching->resist removal). In this embodiment, as illustrated in FIG. 5, the slits 34 are linearly formed along the long edge and the short edge of the base 32 and arranged in the grid.

Figure 3C:
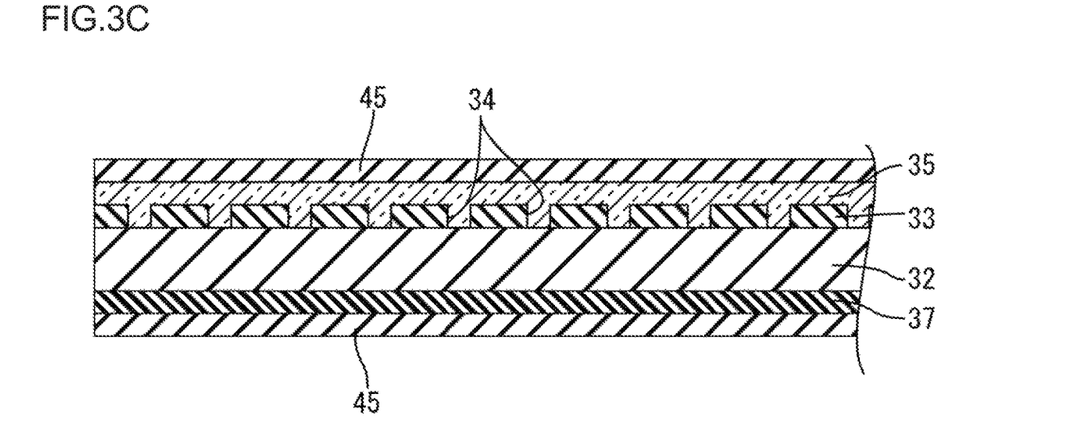
FIG. 3C is a schematic view illustrating a step in the production process of the LED substrate (copper foil formation).
Figure 3D:
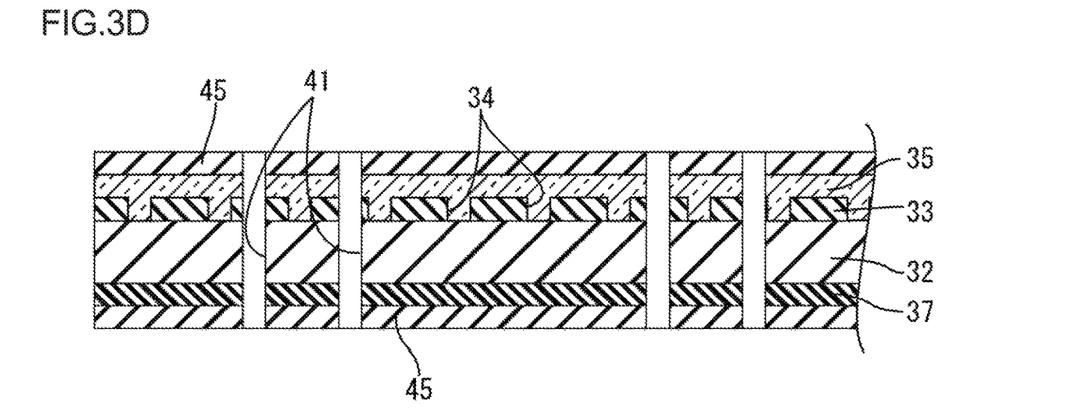
FIG. 3D is a schematic view illustrating a step in the production process of the LED substrate (hole formation).

Next, a copper foil 45 is bonded on the reflection layer 33 with a transparent first insulating layer 35 (an adhesive layer) and copper foil 45 is bonded to the entire back surface with the transparent second insulating layer 37 (an adhesive layer) (see FIG. 3C). Then, the holes 41 are drilled through in the thickness direction at predefined positions using a drill or a laser (see FIG. 3D).

Figure 3E:
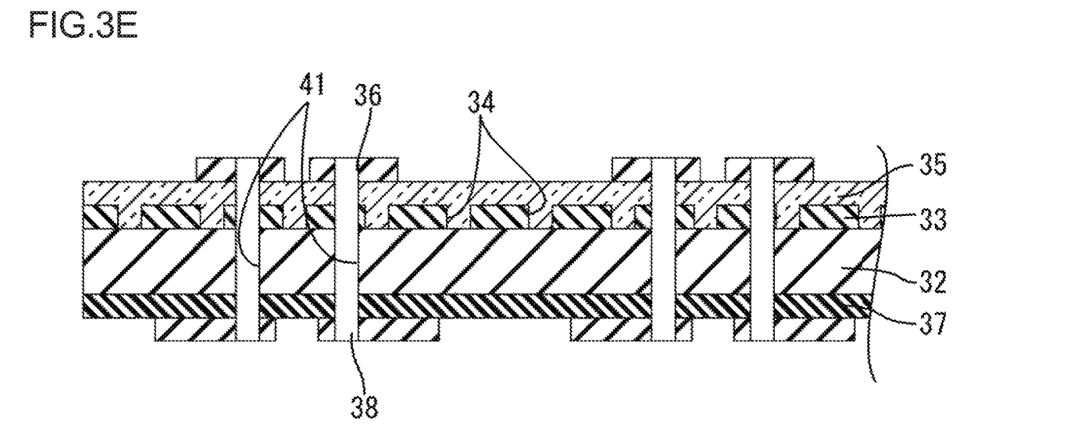
FIG. 3E is a schematic view illustrating a step in the production process of the LED substrate (pattern formation).
Figure 3F:
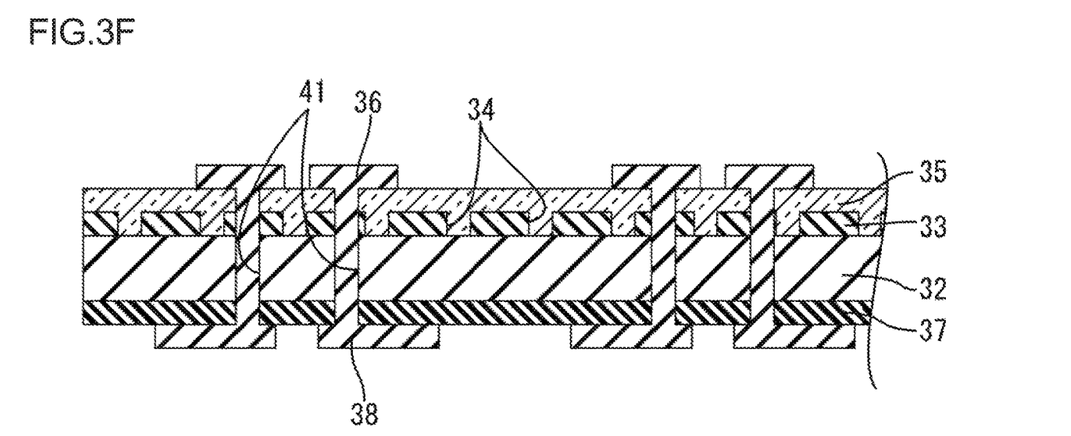
FIG. 3F is a schematic view illustrating a step in the production process of the LED substrate (hole conduction).
Figure 3G:
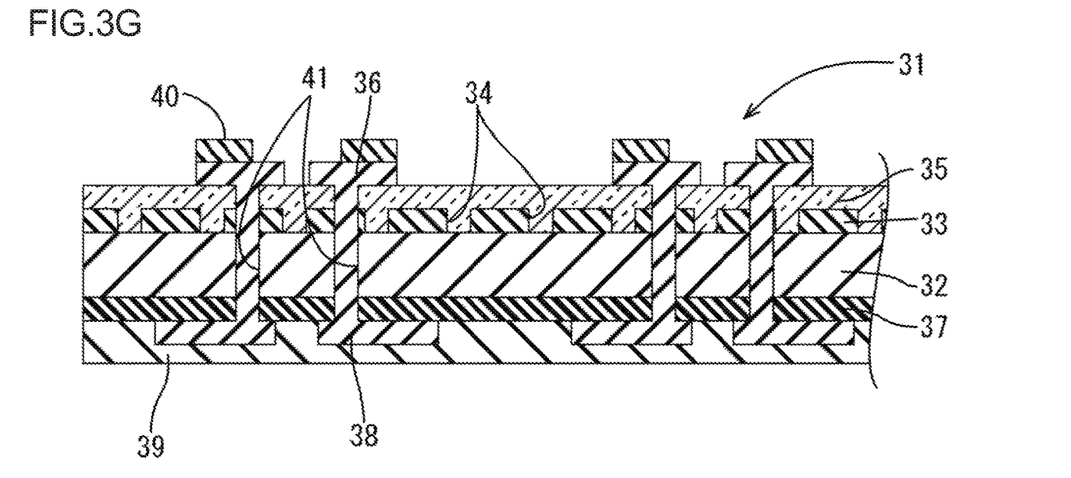
FIG. 3G is a schematic view illustrating a step in the production process of the LED substrate (white resist formation).

Next, the copper foils 45 on the front side and the rear side are patterned to form designed conductive patterns (the first conductive pattern 36 and the second conductive pattern 38) (see FIG. 3E). Then, electroless plating is performed so that the holes 41 are conductive (see FIG. 3F). In FIG. 3F and some drawings, the holes 41 may look as if the holes 41 are filled with conductive materials for convenience; however, conductive layers in film form are on inner walls of the holes 41. The first conductive pattern 36 and the second conductive pattern 38 are electrically connected to each other via the conductive layers in the holes. It is preferable to form the conductive pattern on the back surface. According to the configuration, the areas in which the first conductive pattern is formed on the front side are reduced and the exposed areas of the first plate surface 31A through the first insulating layer 35 are increased. Therefore, the reflectivity improves.

The paint layers 40 such as the white resists are formed in the areas other than the areas in which the electrode pads (the areas to which the electrodes 30A and t30B of the LEDs 30 are electrically connected) through known screen printing. Furthermore, the overcoat layer 39 is stacked on the second conductive pattern 38 (see FIG. 3G). Through the processing, the LED substrate 31 is prepared.

Finally, the first electrodes 30A and the second electrodes 30B of the LEDs 30 are electrically connected to the LED substrate 31 through known reflow soldering (see FIG. 4). Through the processes, the first insulating layer 35 is formed on an entire area of the first plate surface 31A of the LED substrate 31. Therefore, the surface of the reflection layer 33 made of metal having higher reactivity is protected with the first insulating layer 35. It is preferable that transmissivity of the first insulating layer 35 is as high as possible.

When the liquid crystal display device 10 is turned on, the driving of the liquid crystal panel 11 is controlled by the panel control circuit on the control circuit board and the driving of the LEDs 30 on the LED substrate 31 is controlled by the LED driver circuit on the LED driver circuit board. The light from the LEDs 30 that are turned on is applied to the optical member 23 (the diffuser plate 23A and the optical sheet 23B). After the in-plane distribution of the brightness is uniformed by the optical member 23, the light is applied to the liquid crystal panel 11 and used for display of an image based on the display pixels in the liquid crystal panel 11.

Functional effect of the backlight unit 20 in this embodiment will be described. The backlight unit 20 in this embodiment includes the LED substrate 31 and the LEDS 30. The LED substrate 31 includes the first plate surface 31A and the second plate surface 31B. The LEDs 30 are the top-emitting LEDs including the first electrodes 30A and the second electrodes 30B. The reflection layer 33 made of metal, the first insulating layer 35, the first conductive pattern 36 are formed on the first plate surface 31A in this sequence from the lower layer side. The second conductive pattern 38 is formed on the second plate surface 31B. The LEDs 30 are disposed on the first plate surface 31A. The first electrodes 30A and the second electrodes 30B are electrically connected to the first conductive pattern 36. Furthermore, the first electrodes 30A and the second electrodes 30B are electrically connected to the second conductive pattern 38 via the holes 41 in the LED substrate 31. The reflection layer 33 is divided into the divided reflection areas 33A by the slits 34. The holes 41 are formed in the different divided reflection areas 33A.

In this configuration, the complicated circuit required for wiring (the conductive pattern) is disposed on the backside of the LED substrate 31 (on the second plate surface 31B) and the area in which the first conductive pattern 36 is reduced. The exposed areas of the reflection layer 33 increases and thus the reflectivity of the backlight unit 20 improves. Because the reflection layer 33 is made of metal, the electrodes 30A and 30B of one of the LEDs 30 may be electrically connected or electrodes 39A and 30B of different LEDs 30 may be electrically connected via the reflection layer 33 when the conductive material in the corresponding hole 41 contacts the reflection layer 33. According to this embodiment, the reflection layer 33 is divided into the divided reflection areas 33A such that at least one slit 34 is provided between the adjacent holes 41 for every two holes 41. Therefore, the portions between the holes 41 are insulated by the slits 34 and thus electrical connection between the portions is properly reduced. According to this embodiment, the exposed areas of the reflection layer 33 made of metal having higher reflectivity can be increased while reducing the electrical connection between the holes 41. Therefore, the light use efficiency improves and thus the brightness of the backlight unit 20 increases.

The first insulating layer 35 is made of the transparent material and disposed in the entire area of the first plate surface 31A. The surface of the reflection layer 33 made of metal having higher reactivity is protected with the first insulating layer 35. Furthermore, the white paint layer 40 is formed on the surface of the first conductive pattern 36 on the first plate surface 31A. Therefore, the reflectivity of the first conductive pattern 36 having the lower reflectivity increases.

According to the backlight unit 20 in this embodiment, the backlight unit 20 and the liquid crystal display device 10 that include the surfaces having proper reflectivity for the entire areas can be provided. It is especially effective for a configuration in which a pitch of LEDs is 5 mm or less and it is difficult to place a separate reflection sheet.

Other Embodiments

The technology described herein is not limited to the embodiments described in the above descriptions and drawings. The following embodiments may be included in the technical scope of the technology described herein.

Figure 6:
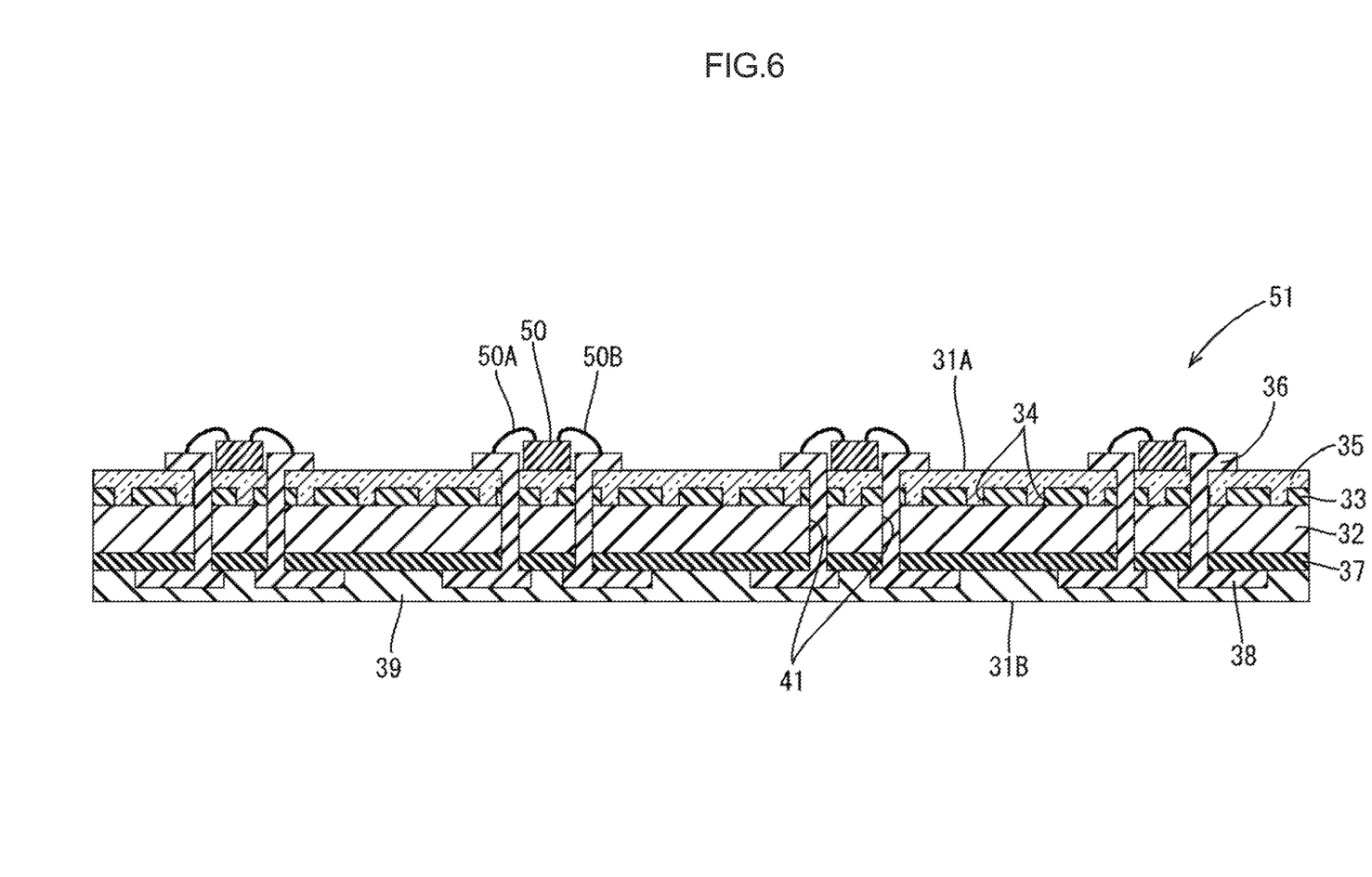
FIG. 6 is a side cross-sectional view of an LED substrate in another embodiment.

(1) In the above embodiment, the flip-chip type LEDs 30 are used. However, the LEDs 30 are not limited to the flip-chip type. As illustrated FIG. 6, LEDs 50 include first electrodes 50A and second electrodes 50B that are disposed on surfaces that are not opposed to an LED substrate 51 and electrically connected to the first conductive pattern 36 through wire bonding. Such LEDs, that is, face-up type LEDs may be used.

Figure 7:
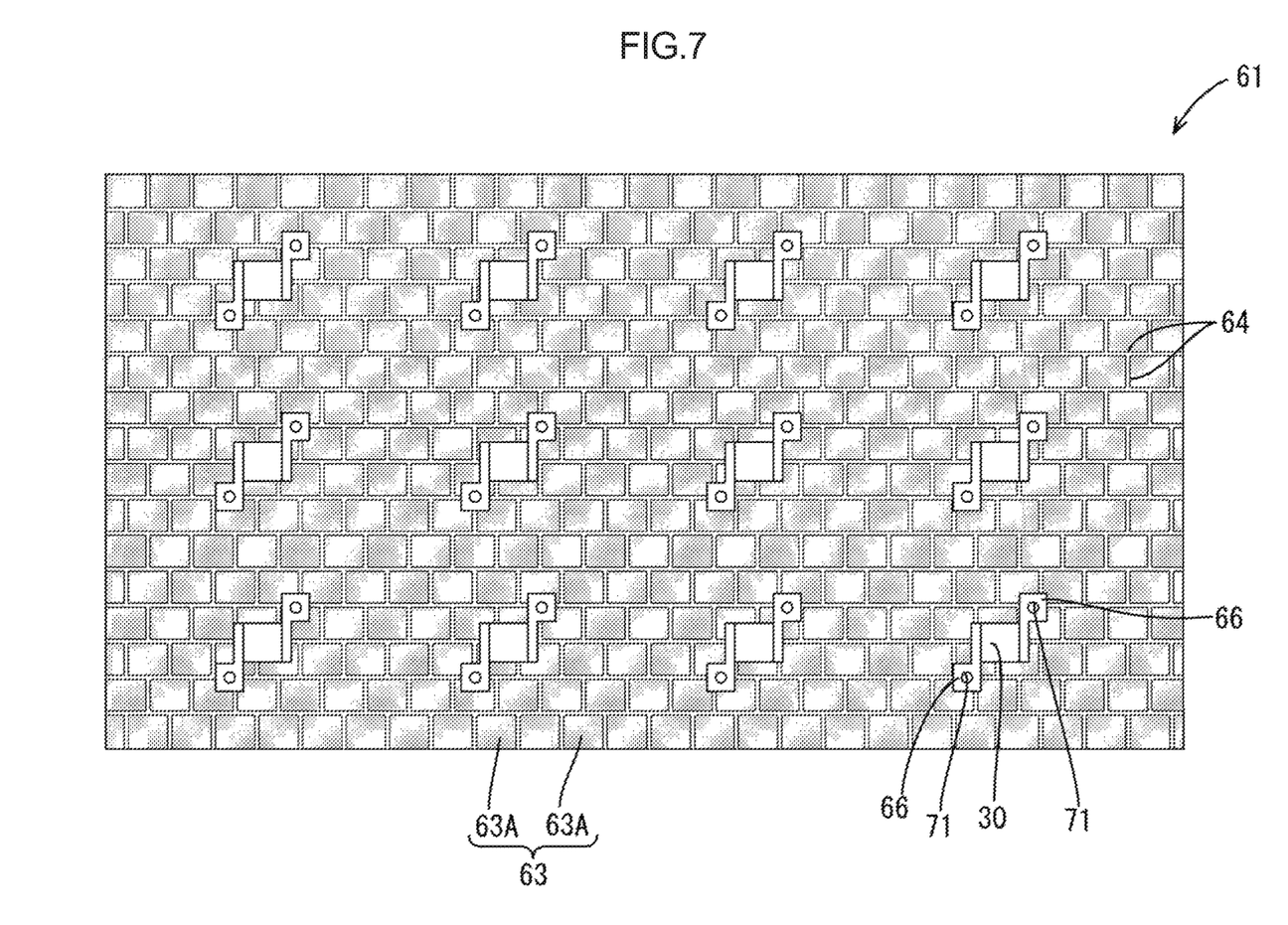
FIG. 7 is a plan view of an LED substrate in another embodiment.
Figure 8:
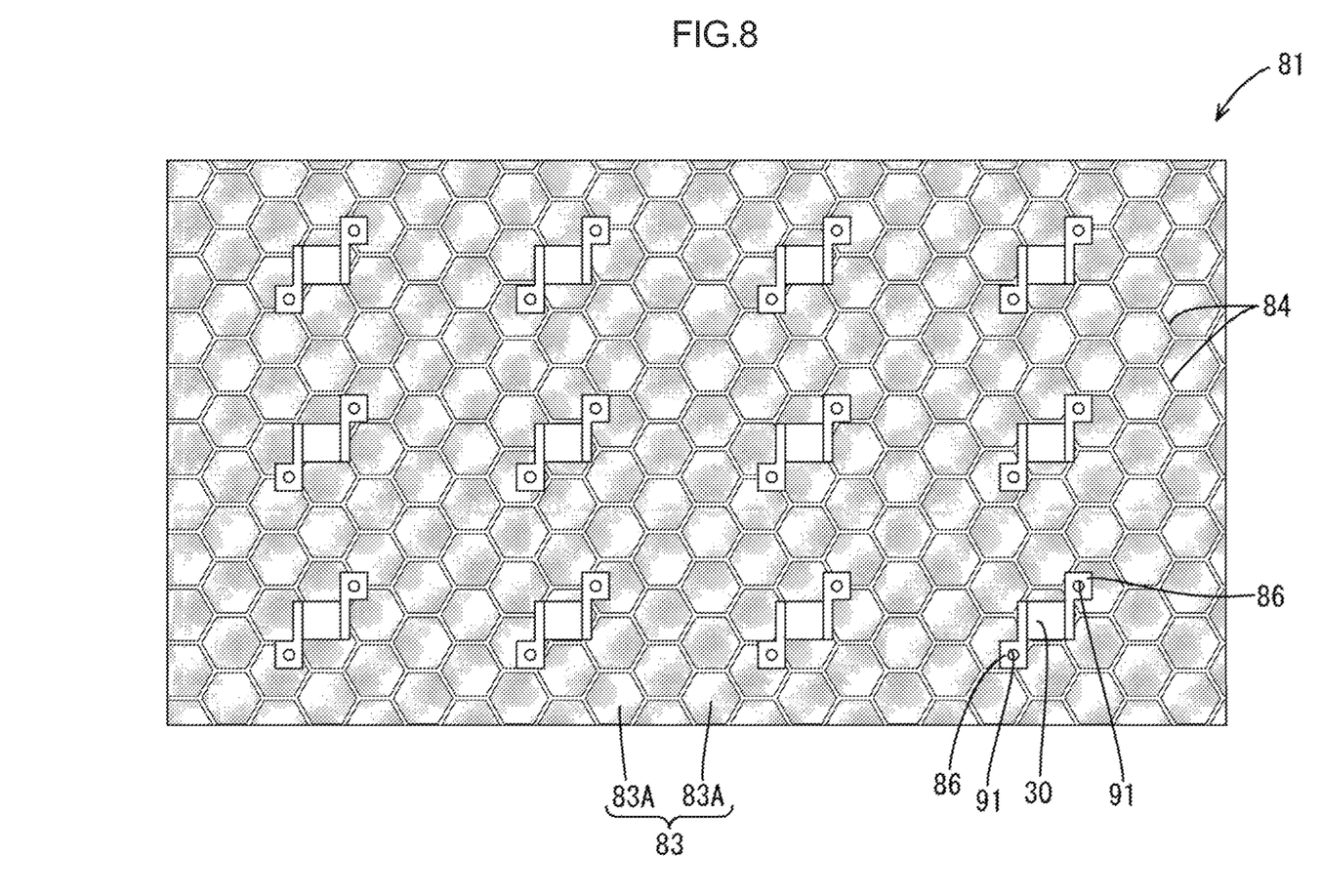
FIG. 8 is a plan view of an LED substrate in another embodiment.
Figure 9:
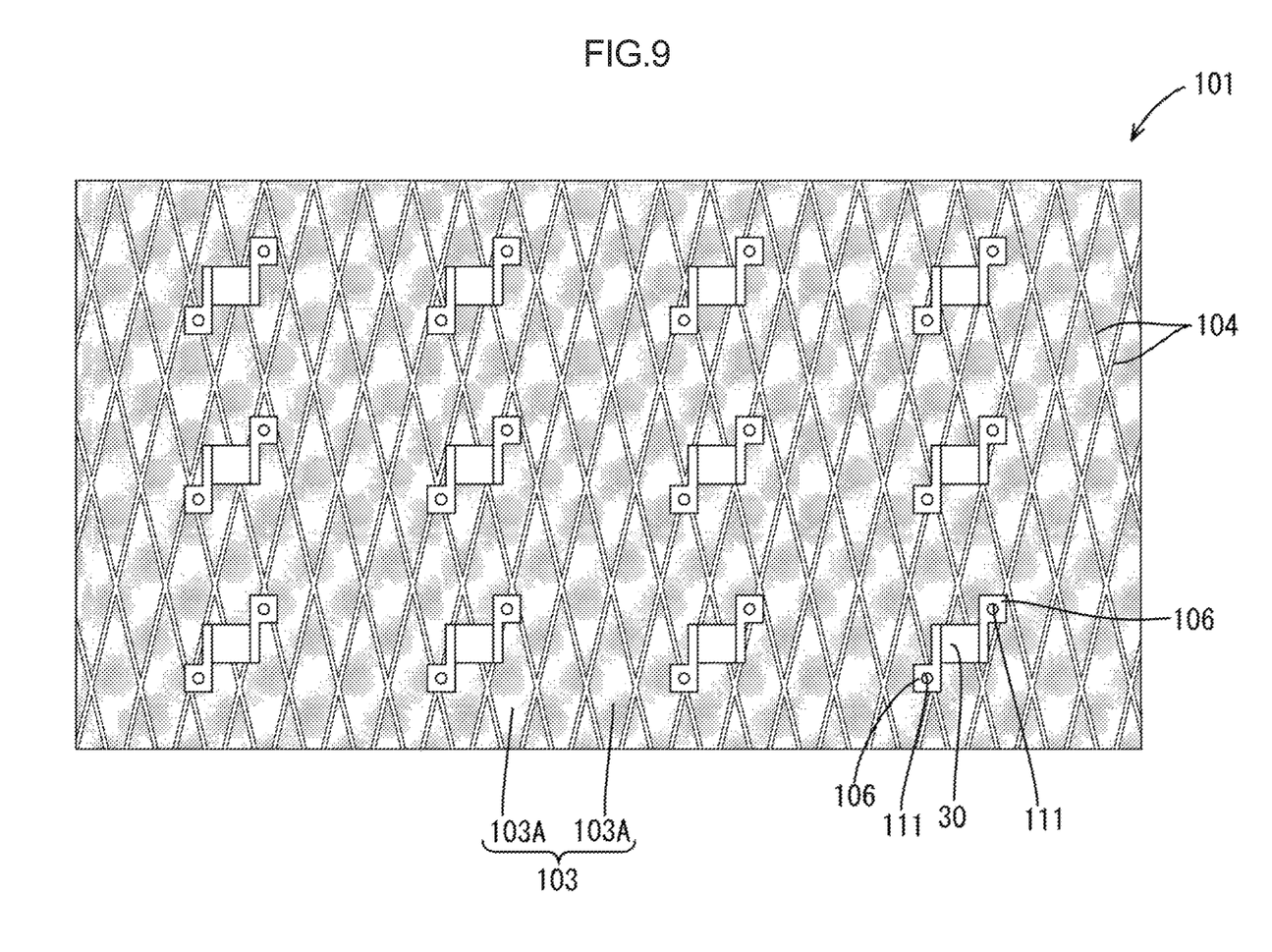
FIG. 9 is a plan view of an LED substrate in another embodiment.

(2) The configuration of the slits 34 (the divided reflection areas 33A) in the reflection layer 33 is not limited to that of the above embodiment. Slits 64 in a brick pattern as illustrated in FIG. 7, slits 34 in a honeycomb pattern as illustrated in FIG. 8, slits 104 in a diamond mesh pattern as illustrated in FIG. 9, slits in irregular patterns, and slits in various patterns may be included in the scope of the technology described herein. The slits can be arranged in any pattern as long as at least one slit 34 is provided between the adjacent holes 41 and the electrical connection within the plane is reduced. The LED substrates illustrated in FIGS. 7 to 9 are indicated by numerals 30, 50, and 70 added to the numeral that indicates the LED substrate in the above embodiment, respectively.

(3) In the above embodiment, the second insulating layer 37 is provided in the layer lower than the second conductive pattern 38. If the base 32 is made of an insulating material, the second insulating layer 37 may not be required.

(4) In the above embodiment, the first insulating layer 35 is disposed on the entire front surface. However, the first insulating layer 35 may be disposed only under the areas in which the first conductive pattern 36 is formed.

(5) In each embodiment, the first conductive pattern 36 includes the electrode pads and lines that electrically connect the electrode pads to the holes 41. However, the first conductive pattern may include portions of other lines. Portions of the first conductive pattern may be routed within the first plate surface 31A without being connected to the second conductive pattern.

(6) In the above embodiment, the portion between two holes 41 connected to the first electrode 30A and the second electrode 308 of one of the LEDs 30 is located between two holes 41 that are separated from each other at the shortest distance. However, the portion between the holes that are connected to the electrodes of different LEDs 30 may be located between two holes 41 that are separated from each other at the shortest distance. Even in this case, two holes are provided in the divided reflection areas. Therefore, the electrical connection via the reflection layer is less likely to occur.

The invention claimed is:

1. A lighting device comprising:
   a substrate including a first plate surface and a second plate surface;
   light sources including first electrodes and second electrodes, the light sources being top-emitting light sources, wherein
   a reflection layer made of metal, an insulating layer, and a first conductive pattern are formed on the first plate surface in this sequence from a lower layer side,
   a second conductive pattern is formed on the second plate surface,
   the light sources are disposed on the first plate surface with the first electrodes and the second electrodes electrically connected to the first conductive pattern and at least the first electrodes or the second electrodes electrically connected to the second conductive pattern via holes in the substrate,
   the reflection layer is divided into divided reflection areas by slits, and
   the holes are formed in the divided reflection areas, respectively.

2. The lighting device according to claim 1, wherein the reflection layer has a thickness in a range from 0.05 μm to 1 μm.

3. The lighting device according to claim 1, wherein the slits have widths in a range from 3 μm to 30 μm.

4. The lighting device according to claim 1, wherein the slits are arranged at equal intervals with a pitch in a range from 0.1 mm to 5 mm.

5. The lighting device according to claim 1, wherein the insulating layer is made of a transparent material and disposed in an entire area of the first plate surface.

6. The lighting device according to claim 1, further comprising a white paint layer on a surface of the first conductive pattern.

7. The lighting device according to claim 1, wherein the first electrodes and the second electrodes are disposed on surfaces of the light sources opposed to the substrate and mounted on the first conductive pattern using a flip-chip packaging technology.

8. The lighting device according to claim 1, wherein the first electrodes and the second electrodes are disposed on surfaces of the light sources other than surfaces opposed to the substrate and mounted on the first conductive pattern through wire bonding.

9. A display device comprising:
a lighting device according to claim 1; and
a display panel.

* * * * *